United States Patent [19]

Nolan

[11] 4,100,905
[45] Jul. 18, 1978

[54] FUEL VAPORIZER

[76] Inventor: Joe M. Nolan, P. O. Box 1263, Longview, Tex. 75601

[21] Appl. No.: 802,242

[22] Filed: May 31, 1977

[51] Int. Cl.² .......................................... F02M 29/00
[52] U.S. Cl. ............................ 123/141; 123/52 MV; 48/180 R
[58] Field of Search .................... 123/141, 52 MV; 48/180 R, 180 B; 261/78 R

[56] References Cited

U.S. PATENT DOCUMENTS

| | | | |
|---|---|---|---|
| 2,844,133 | 7/1958 | Thompson | 123/52 MV X |
| 3,607,155 | 9/1971 | Faltermeier | 123/141 X |
| 3,742,923 | 7/1973 | Oblander et al. | 123/52 MV X |
| 3,841,284 | 10/1974 | Krygowski | 123/52 MV X |
| 3,874,357 | 4/1975 | List et al. | 123/141 X |
| 4,011,850 | 3/1977 | Knox | 123/141 |
| 4,019,482 | 4/1977 | Pugliese | 123/141 |

*Primary Examiner*—Charles J. Myhre
*Assistant Examiner*—Ira S. Lazarus
*Attorney, Agent, or Firm*—Clarence A. O'Brien; Harvey B. Jacobson

[57] ABSTRACT

A hollow intake manifold-type body is provided for mounting between the cylinder banks of a V-type engine and the hollow body defines a vertically oriented inlet passage, a horizontally enlarged lower chamber into whose upper central portion the lower end of said intake passage opens, a horizontal baffle disposed in and dividing the lower chamber into upper and lower chamber sections communicated with each other in corresponding outer peripheral zones thereof spaced outwardly of the baffle, a vertically oriented outlet passage whose lower end opens downwardly through a central portion of the baffle and an upper chamber above the lower chamber and vertically through which the inlet passage extends. The outlet passage opens upwardly centrally into the upper chamber and the body additionally defines peripherally spaced intake runner passages opening outwardly of opposite sides of the body from the upper chamber at points spaced therealong for registry with the inlet ports formed in cylinder heads mounted on the cylinder banks. A filter screen is disposed across the communicating outer peripheral portions of the lower and upper chamber sections of the lower chamber and functions to break up any droplets of fuel attempting to pass therethrough. The air and fuel mixture is expanded and thus experiences a decrease in velocity during its movement through the fuel vaporizer and the droplets of fuel therein are broken up and thus afforded more time to completely vaporize.

9 Claims, 3 Drawing Figures

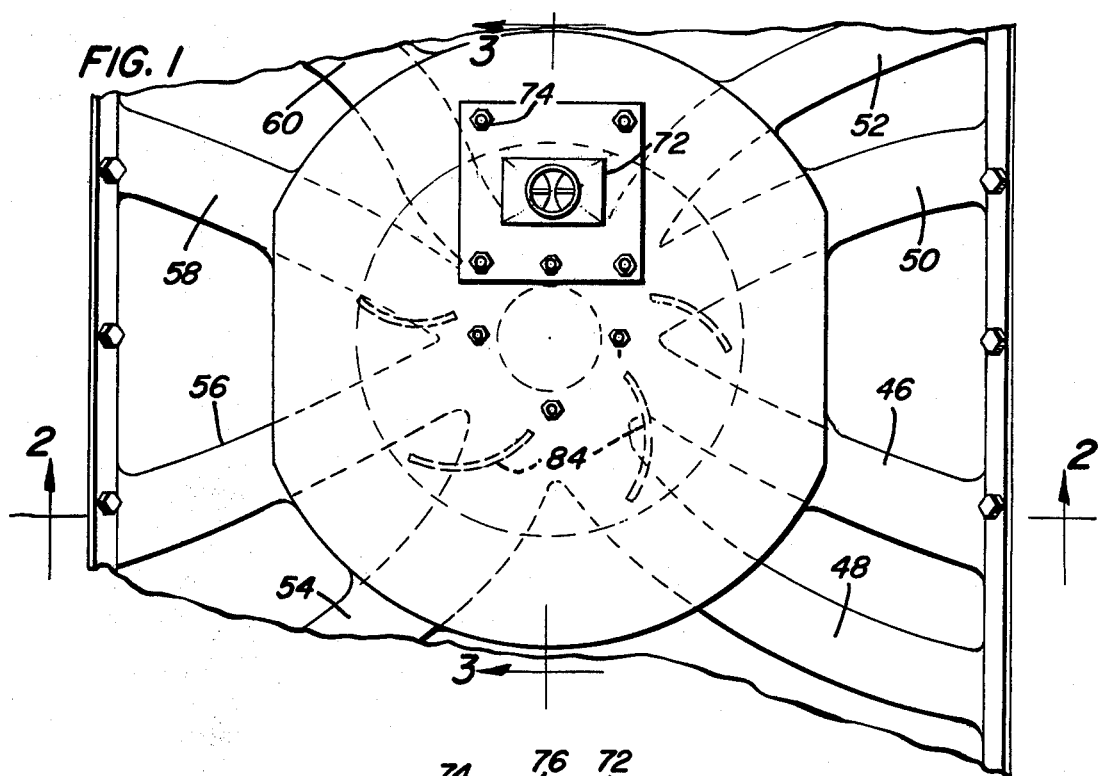
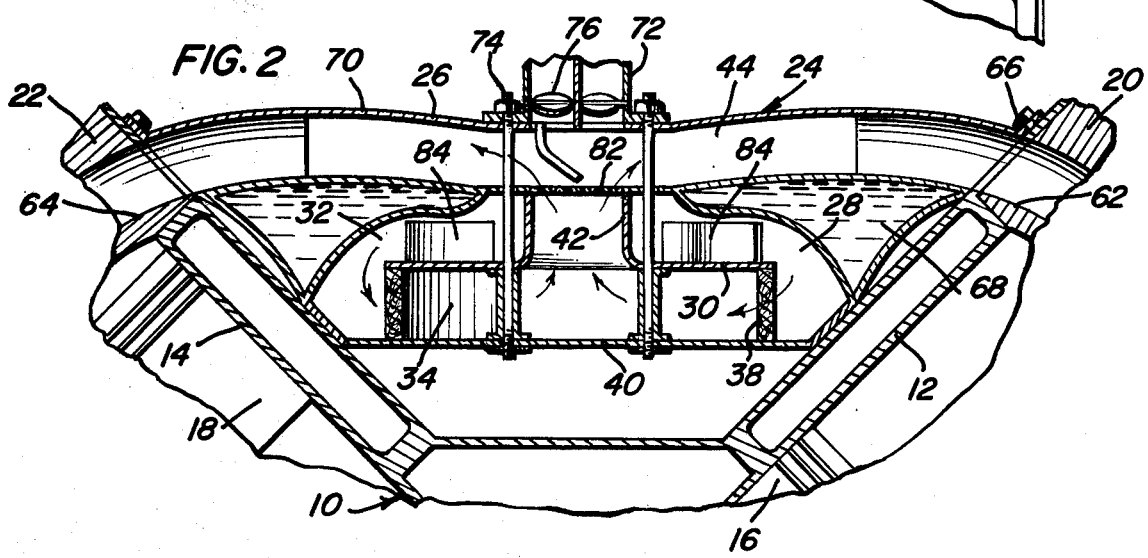
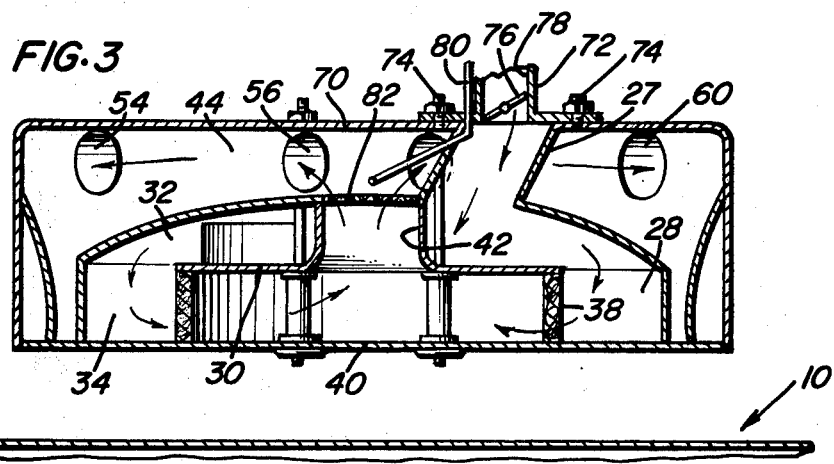

FUEL VAPORIZER

BACKGROUND OF THE INVENTION

It has long been known that better vaporization of the liquid fuel component of the air and fuel mixture supplied to an internal combustion engine will result in additional power, increased fuel mileage and less exhaust gas pollutants. Accordingly, many attempts have been made to increase vaporization of the fuel component of an air and fuel mixture. While heating the air and fuel mixture comprises one means by which vaporization of liquid fuel may be enhanced, numerous other means may be used in lieu of, or in conjunction with, heating the mixture.

BRIEF DESCRIPTION OF THE INVENTION

The vaporizer of the instant invention is designed as a replacement for the conventional intake manifold of a V-type internal combustion engine and is provided to insure more complete vaporization of the liquid fuel component in an air and fuel mixture. The vaporizer includes five major aspects which each function to increase liquid fuel vaporization and the five aspects coact with each other in a manner which is believed to result in an aggregate increase toward total liquid fuel vaporization which is in excess of the combined increases in fuel vaporization which may be attributed to the five aspects.

In the first instance, the air and fuel induction passages of the function to decrease the velocity of the air and fuel mixture passing therethrough and the effective length of the induction passages are increased thus greatly extending the time the air and fuel mixture takes to pass through the vaporizer. The vaporizer further includes internal fins for imparting turbulence to the air and fuel mixture passing therethrough. The vaporizer also includes a screen section through which the air and fuel mixture must pass during its initial one-third passage through the vaporizer and the screen structure insures the breaking up of initial large droplets of liquid fuel which may be entrained in the air and fuel mixture passing through the vaporizer. It is also pointed out that the fuel vaporizer defines air and fuel mixture induction passages which are increased in length and thereby function, to some extent, in ram charging the associated cylinder. Finally, the vaporizer functions to more evenly and thoroughly heat the air and fuel mixture as a result of heating temperatures applied to the vaporizer which are considerably lower than those which would be applied as a result of exhaust gas heating but which act upon the air and fuel mixture for a longer time.

The main object of this invention is to provide a fuel vaporizer for substantially completely vaporizing liquid fuel in an air and fuel mixture.

A further object is to provide a vaporizer which functions to expand, and thus decrease the speed of, the air and fuel mixture passing through the vaporizer.

An important object is to effectively increase the length of the air and fuel mixture induction passages.

Another important object of this invention is to provide a fuel vaporizer having increased internal volume whereby variations in the rate of air flow through the associated carburetor may be modulated during rapid opening of the throttle valve of the carburetor.

Another very important object of this invention is to provide a fuel vaporizer including structure by which the air and fuel mixture passing therethrough may be subject to thorough mixing as a result of being swirled at high speeds.

Still another object of this invention is to provide an apparatus in accordance with the preceding objects and constructed in a manner whereby the increased liquid fuel vaporization obtained is accomplished by even heating of the air and fuel mixture during its movement through air and fuel induction passages of increased length.

A final object of this invention to be specifically enumerated herein is to provide a fuel vaporizer in accordance with the preceding objects and which will conform to conventional forms of manufacture, be of simple construction and thorough in operation so as to provide a device that will be economically feasible, long lasting and relatively trouble free.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary top plan view of the fuel vaporizer of the instant invention with a portion of the attached carburetor being broken away and illustrated in horizontal section;

FIG. 2 is a fragmentary vertical transverse sectional view taken substantially upon the plane indicated by the section line 2—2 of FIG. 1 and with the vaporizer operatively associated with a V-type internal combustion engine; and FIG. 3 is a fragmentary vertical sectional view taken substantially upon the plane indicated by the section line 3—3 of FIG. 1.

DETAILED DESCRIPTION OF THE INVENTION

Referring now more specifically to the drawings, the numeral 10 generally designates a conventional form of V-type internal combustion engine. The engine 10 includes a pair of opposite side cylinder banks 12 and 14 in which pistons 16 and 18 are reciprocal. The cylinder banks 12 and 14 have cylinder heads 20 and 22 mounted thereon and an intake manifold (not shown) of conventional design is usually mounted between the cylinder banks 12 and 14 and bolted to the cylinder heads 20 and 22 adjacent the inlet ports thereof.

The fuel vaporizer of the instant invention is in the form of an improved intake manifold referred to in general by the reference numeral 24. The manifold 24 comprises a body 26 defining a vertically oriented inlet passage 27 opening downwardly into a lower chamber 28. The lower chamber 28 includes a horizontal baffle 30 disposed therein dividing the lower chamber 28 into upper and lower chamber sections 32 and 34 above and below the baffle 30 and a cylindrical screen assembly 38 underlies the outer periphery of the generally circular baffle 30 and extends between the latter and the lower wall 40 of the lower section 34 of the lower chamber 28.

The baffle 30 has a central aperture formed therein and a vertically oriented outlet tube 42 opens downwardly through the center of the baffle 30 and upwardly into an upper chamber 44 defined by the body 26. The upper chamber 44 is generally circular in plan shape and in the body 26 includes branch tubes 46, 48, 50, 52, 54, 56, 58 and 60 opening outwardly from the opposite sides of the upper chamber 44 and extending to the intake ports 62 and 64 formed in the heads 20 and 22. The body 26 is bolted to the heads 20 and 22 by means of suitable fasteners 66 and the body 26 defines a water coolant passage 68 formed therethrough below the branch tubes 46-60 and above the lower chamber 28 whereby the underside of the upper chamber 44, the undersides of the branch tubes 46-60 and the upperside of the upper section 32 of the lower chamber 28 may be heated by coolant fluid pumped through the passage 68 by any convenient means (not shown), The body 26 includes a top wall 70 which closes the upper chamber 44 from above and through which the upper end of the intake passage or tube 27 opens. The flanged base of a conventional form of carburetor 72 is bolted in position over the upper end of the intake passage 27 by suitable fasteners 74 and the carburetor is of substantially conventional design including a throttle plate 76 for throttling the flow of air and fuel through the air and fuel passages 78 extending through the carburetor 72. As is conventional, the carburetor 72 includes an accelerator pump circuit, but instead of the accelerator pump jetting excess fuel directly into the air and fuel passage 78 above the throttle plates 76, the discharge of the throttle or accelerator pump comprises a tube 80 which extends downwardly through the opening formed in the top wall 70 over which the carburetor 72 is secured and then laterally through the intake tube 27 to a position directly over a flame arrester screen 82 secured over the upper end of the outlet tube 42. In this manner, the additional fuel required under rapid opening of the throttle plates 76 is discharged directly into the heated air and fuel stream passing through the flame arrester screen 82 and into the upper chamber 44 subsequent to passage through the branch tubes 46-60.

In addition to the adjacent portions of the body 26 defining the air and fuel passage extending therethrough being heated by the liquid coolant pumped through the passage or chamber 68, the bottom wall 40 is heated by radiant heat from the engine 10. Further, the upper surface of the baffle includes radially outwardly extending and curving fins 84 projecting upwardly therefrom which impart a swirling movement to the air and fuel mixture passing from the upper section 32 of the chamber 28 to the lower section 34 thereof.

It is also pointed out that the internal volume of the air and fuel passages extending through the body 26 is considerable and therefore that sudden fluctuations in the velocity of air and fuel mixtures passing through the body 26 are modulated to some extent between the intake ports 62 and 64 and the lower end of the carburetor 72. Further, the total distance travelled by air and fuel mixtures passing through the body 26 is considerable and the time required for the fuel and air mixture to reach the intake ports of the heads is greatly increased thereby allowing more time for the liquid fuel to more completely vaporize. Still further, during this extended time the air and fuel mixture may be more evenly and thoroughly heated through the utilization of the heated liquid coolant as opposed to considerably hotter exhaust gases. Also inasmuch as the branch tubes 46-60 are considerable in length, some increase in performance is realized as a result of ram charging of the cylinders of the combustion engine 10.

It will be noted that as the air and fuel mixture is discharged from the carburetor 72, it is expanded and therefore decelerated in the upper chamber section 32. Then, the mixture is accelerated as it passes around the outer periphery of the baffle 30 and thereafter decelerated as it moves into the lower chamber section 34. During subsequent upper movement through the outlet tube 42 the mixture is again accelerated and again decelerated upon movement into the upper chamber 44. Of course, during its passage through the vaporizer, the mixture is also laterally accelerated in at least four instances.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fuel vaporizer for a V-type internal combustion engine, said vaporizer comprising a hollow intake manifold-type body for mounting between the cylinder banks of a V-type engine, said hollow body including means defining vertically oriented inlet passage means, a horizontally enlarged lower chamber into whose upper central portion the lower end of said intake passage means opens, a horizontal baffle disposed in and dividing the lower chamber into upper and lower chamber sections communicated with each other in corresponding outer peripheral zones thereof spaced outwardly of corresponding peripheral portions of said baffle, and vertically oriented outlet passage means whose lower end opens downwardly through a central portion of said baffle, said body further including means defining an upper chamber above said lower chamber and vertically through which said inlet passage means extends, said outlet passage means opening upwardly centrally into said upper chamber, said body additionally including means defining peripherally spaced intake runner passages opening outwardly of opposite sides of said body at points spaced therealong for registry with inlet ports formed in cylinder heads mounted on said cylinder banks, and a fuel and air charge forming device having an outlet end coupled to the upper end of said inlet passage.

2. The combination of claim 1 wherein said body defines air and fuel mixture swirling fins projecting upwardly from said baffle about said outlet passage means spaced and curving outwardly from the latter.

3. The combination of claim 1 including an annular screen structure extending about the outer periphery of said baffle and disposed between the latter and the underlying lower extremities of said lower chamber lower section.

4. The combination of claim 1 wherein said fuel and air charge forming device comprises a carburetor equipped with a throttle linkage actuated accelerator pump including a fuel outlet, said fuel outlet discharging directly into said upper chamber in registry with the upper end of said outlet passage means.

5. The combination of claim 4 wherein said body includes means defining a hollow chamber overlying and in good heat transfer relation with said upper chamber and adapted to have heated engine coolant circulated therethrough.

6. The combination of claim 5 including a fire arresting screen structure disposed over the upper outlet end of said outlet passage means opening into said upper chamber.

7. The combination of claim 6 wherein said body defines air and fuel mixture swirling fins projecting upwardly from said baffle about said outlet passage means spaced and curving outwardly from the latter.

8. The combination of claim 7 including an annular screen structure extending about the outer periphery of said baffle and disposed between the latter and the underlying lower extremities of said lower chamber lower section.

9. The combination of claim 1 wherein said upper section of said lower chamber includes air and fuel mixture flow diverting fins for imparting a swirling motion to said mixture as it moves through said upper section.

* * * * *